US010039005B2

United States Patent
Shahar (10) Patent No.: US 10,039,005 B2
(45) Date of Patent: Jul. 31, 2018

(54) SYSTEM AND METHOD FOR DYNAMIC ALLOCATION OF FREQUENCY SUB-CHANNELS FOR WIRELESS COMMUNICATION

(71) Applicant: Full Spectrum Inc., Sunnyvale, CA (US)

(72) Inventor: Menashe Shahar, Los Altos, CA (US)

(73) Assignee: FULL SPECTRUM INC., Sunnyvale, CA (US)

( * ) Notice: Subject to any disclaimer, the term of this patent is extended or adjusted under 35 U.S.C. 154(b) by 17 days.

(21) Appl. No.: 15/203,588

(22) Filed: Jul. 6, 2016

(65) Prior Publication Data

US 2017/0034826 A1 Feb. 2, 2017

Related U.S. Application Data (60) Provisional application No. 62/189,390, filed on Jul. 7, 2015.

(51) Int. Cl.

| | |
|---|---|
| *H04W 16/04* | (2009.01) |
| *H04J 11/00* | (2006.01) |
| *H04L 5/00* | (2006.01) |
| *H04W 88/08* | (2009.01) |
| *H04W 88/12* | (2009.01) |

(52) U.S. Cl.
CPC ......... *H04W 16/04* (2013.01); *H04J 11/0056* (2013.01); *H04L 5/003* (2013.01); *H04W 88/08* (2013.01); *H04W 88/12* (2013.01)

(58) Field of Classification Search
None
See application file for complete search history.

(56) References Cited

U.S. PATENT DOCUMENTS

| | | | | |
|---|---|---|---|---|
| 2007/0192663 A1* | 8/2007 | Jijina | ............... | H03M 13/35 714/752 |
| 2007/0213069 A1* | 9/2007 | Ji | ............... | H04W 16/02 455/450 |
| 2009/0185529 A1* | 7/2009 | Tsuji | ............... | H04W 28/18 370/329 |
| 2009/0238090 A1* | 9/2009 | Sambhwani | ............... | H04W 28/16 370/252 |
| 2010/0303033 A1* | 12/2010 | Shahar | ............... | H04W 72/1257 370/329 |
| 2016/0037542 A1* | 2/2016 | Tang | ............... | H04W 72/10 370/329 |

* cited by examiner

*Primary Examiner* — Gregory Sefcheck
*Assistant Examiner* — Srinivasa Reddivalam
(74) *Attorney, Agent, or Firm* — Pearl Cohen Zedek Latzer Baratz LLP (57) ABSTRACT

An OFDMA system and method for dynamic allocation of sub-channels for a plurality of base stations. The allocation of frequencies may be performed by first allocating to the base stations a first plurality of sub-channels according to a static allocation, wherein the number of sub-channels allocated to each base station is less than the number of available sub-channels, thereby resulting in available remaining sub-channels for each base station that are not assigned in the static allocation, then, after receiving a request from a base station for increased throughput in the downlink and/or uplink direction, allocating at least one additional sub-channel to the requesting base station from among said remaining sub-channels not in use for static allocation according to a dynamic allocation.

11 Claims, 4 Drawing Sheets

SYSTEM AND METHOD FOR DYNAMIC ALLOCATION OF FREQUENCY SUB-CHANNELS FOR WIRELESS COMMUNICATION

CROSS REFERENCE TO RELATED APPLICATION

This application claims the benefit of U.S. Provisional Patent Application No. 62/189,390, filed Jul. 7, 2015, the entirety of which is incorporated herein by reference.

FIELD OF THE INVENTION

The present invention relates generally to broadband wireless communication systems, and more specifically to a broadband wireless communication system and a method for dynamic allocation of sub-channels therein.

BACKGROUND OF THE INVENTION

Orthogonal Frequency Division Multiple Access (OFDMA) is a multi-user variation of Orthogonal Frequency Division Multiplexing (OFDM) which has emerged as a key technology to improve efficiency in advanced infrastructure-based wireless networks. OFDM is a modulation method that divides a channel into multiple narrow orthogonal bands that are spaced apart so as to avoid interference with one another. OFDMA combines OFDM on the physical layer with Frequency and Time Division Multiple Access on the media access control (MAC) layer, allowing the assignment of different sub-channels to different nodes in order to support Point to Multipoint operation. Sub-channels may consist of adjacent or non-adjacent sub-carriers.

In OFDMA systems, the allocation of two dimensional (time and frequency) slots in the uplink and downlink direction is determined by an allocation map transmitted periodically by the base station to the remote stations. The allocation is done within the sub-channels available to each base station. Cellular wireless communication systems may employ frequency reuse, which generally refers to the process of using the same radio frequencies for communications for geographic areas that are separated by sufficient distance so as to cause no or minimal interference with each other (e.g., interference below a threshold level). The frequency re-use scheme is characterized by nomenclature (N, S, K), where N=Cells per cluster, S=Sectors per cell, and K=Number of sub-channel groups.

The system may employ Time Division Duplexing (TDD) with programmable downlink to uplink symbol ratio and programmable gaps. Each TDD frame includes a downlink sub-frame (DLSF), an uplink sub-frame (ULSF), a transmit to receive gap (TTG), and a receive to transmit gap (RTG). The TDD frame may be GPS synchronized, and its configuration may be identical across all sectors. Generally, the base station (BS) allocates distinct slots in the DLSF and ULSF in each TDD frame to satisfy the instantaneous bandwidth required for communication between the BS and each of the remote stations.

Each base station may allocate slots subject to the air interface resources available to its sector. The downlink MAP (DL-MAP) is a broadcast message transmitted in the downlink (DL) direction to transmit the map of the DL allocations to all remote stations. The basic element of the DL-MAP is an information element (IE) called DL MAP IE that specifies allocations to remote stations within a particular frame. The uplink MAP (UL-MAP) may include the UL MAP IE defining uplink (UL) allocations for all UL bursts transmitted by remote stations.

SUMMARY OF THE INVENTION

According to embodiments of the invention, there is provided a method of dynamic allocation of sub-channels in an OFDMA wireless network having a plurality of cells, for use in a base station controller, the method comprising: allocating to a plurality of base stations a first plurality of sub-channels according to a static allocation, wherein the number of sub-channels allocated to each base station is less than the number of available sub-channels, thereby resulting in available remaining sub-channels for each base station that are not assigned in the static allocation; receiving a request from at least one of said base stations for increased throughput in downlink and/or uplink; allocating at least one additional sub-channel to said requesting base station from among said remaining sub-channels not in use for static allocation according to a dynamic allocation; and transmitting a message to said requesting base station based on said dynamic allocation.

According to some embodiments, the method further comprises after allocating said first plurality of sub-channels, determining available remaining sub-channels for dynamic allocation, wherein dynamically allocating said at least one additional sub-channel is based on idle sub-channels.

According to some embodiments, the remaining available sub-channels for dynamic allocation include air interface resources used by base stations that substantially do not interfere with each said base station.

According to some embodiments, the static allocation allocates air interface resources on a first channel and the dynamic allocation allocates air interface resources on a second channel.

According to some embodiments, the OFDMA wireless communication system is configured for a plurality of uplink sub-channels and a plurality of downlink sub-channels, wherein the static allocation includes one downlink sub-channel and one uplink sub-channel for each said base station, and wherein dynamically allocating the additional sub-channel comprises allocating additional air interface resources from the sub-channels not assigned in the static allocation.

According to some embodiments, the method further comprises at a base station: receiving the message based on said dynamic allocation; and transmitting to remote stations in communication with the base station to communicate according to the dynamic allocation.

According to embodiments of the invention, there is provided a base station controller configured to manage dynamic allocation of sub-channels for a plurality of base stations in an OFDMA wireless network, the base station controller comprising: a processor; a non-transitory computer-readable medium in data communication with the processor and comprising instructions which when executed cause the processor to: allocate to said plurality of base stations a first plurality of sub-channels according to a static allocation, wherein the number of sub-channels allocated to each base station is less than the number of available sub-channels, thereby resulting in available remaining sub-channels for each base station that are not assigned in the static allocation; receive a request from at least one of said base stations for increased downlink and/or uplink throughput; allocate at least one additional sub-channel to the requesting base station from among said available remaining sub-channels according to a dynamic allocation; and, transmit a message notifying of allocation of the allocation of said at least one additional sub-channel to the requesting base station.

According to some embodiments, the instructions when executed further cause the processor to: after allocating said first plurality of sub-channels, determine available remaining sub-channels for dynamic allocation, wherein said processor is to allocate said at least one additional sub-channel based on idle sub-channels.

According to some embodiments, the remaining available sub-channels for dynamic allocation include air interface resources used by base stations that substantially do not interfere with other geographically proximate base stations.

According to embodiments of the invention, there is provided an OFDMA wireless communication system including: a plurality of base stations; a base station controller in communication with said plurality of base stations, said base station controller for managing dynamic allocation of sub-channels for said plurality of base stations, and configured to: allocate to said plurality of base stations a first plurality of sub-channels according to a static allocation, wherein the number of sub-channels allocated to each base station is less than the number of available sub-channels, thereby resulting in available remaining sub-channels for each base station that are not assigned in the static allocation, receive a request from at least one of the said base stations for increased throughput in downlink and/or uplink, allocate at least one additional sub-channel to said requesting base station from among said remaining sub-channels not in use for static allocation according to a dynamic allocation, and transmit a message to said requesting base station on said dynamic allocation; wherein said base stations are configured, upon receiving said message from the base station controller, to transmit to geographically proximate remote stations an uplink and/or downlink map based on said message received from the base station controller.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIGS. 1-4, which show various aspects of a method and system for dynamic allocation of frequency sub-channels in a broadband wireless communication system, according to some embodiments of the invention.

Figure 1:
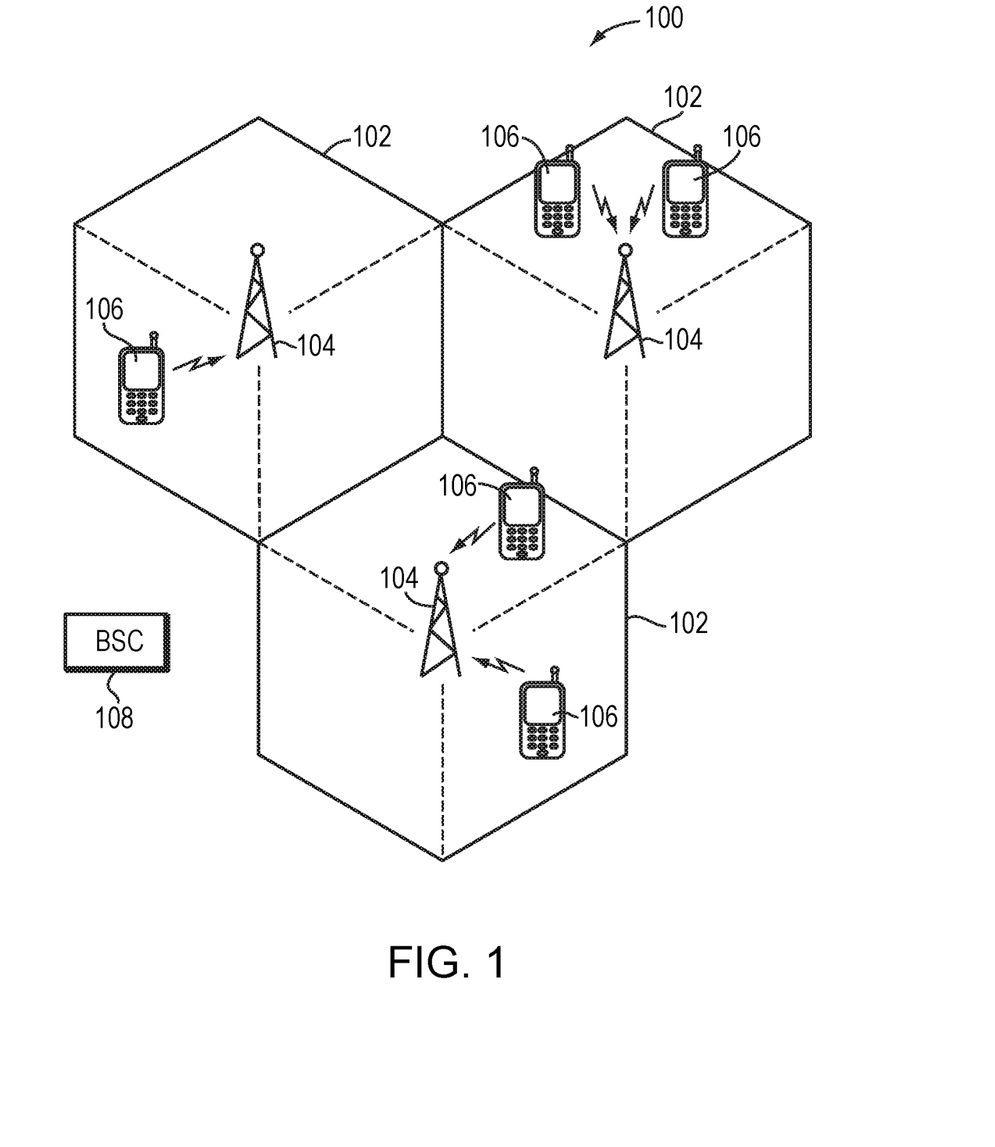
FIG. 1 is a schematic illustration of an OFDMA network according to embodiments of the invention.

FIG. 1 schematically illustrates an OFDMA network, generally designated 100, having a plurality of cells 102. Although few cells are depicted, it will be understood that a communication system will typically include many such cells. Each cell may include a plurality of sectors, for example, three sectors, where each sector in the cell is served by a separate base station 104, each typically covering approximately 120 degrees. Each cell has one tower in which base stations of the cell are located. Each base station serves one sector. All base stations of the cell are located at the same tower. The minimum number of base stations per tower is equal to the number of sectors in the cell. There may be however multiple base stations in one sector.

Each of the sectors may include a plurality of remote stations 106 in wireless communication with the base station covering the respective sector. It will be understood that the terms "remote station" or "mobile station" refer to devices that communicate wirelessly with base stations, e.g., mobile phones, cellular communication devices, etc. Remote stations may be fixed or mobile.

In the descriptions that follow, embodiments of the invention are described with connection with orthogonal frequency division multiple access (OFDMA) systems. It will be understood that the invention may be implemented in a variety of OFDMA systems compatible with IEEE 802.16x (e.g., IEEE 802.16e), such as for example, Worldwide Interoperability for Microwave Access (WiMAX), LTE, or others.

Generally, in an OFDMA communication system, uplink and downlink air interface resources available at each sector are allocated by transmission of an allocation map by each base station to remote stations within the sector. That is, the BS at each sector serves as the central controller for allocation of air interface resources (e.g., one or more sub-channels) to remote stations in its respective sector. Allocation of resources may generally be made based on request by remote stations for bandwidth allocation, which in turn may be based on the needs of applications operating on each remote station.

Some OFDMA systems may be characterized by remote stations having long or substantially continuous periods of low traffic requirements, and short or sporadic periods of high traffic requirements. Examples of systems having low traffic volume are various machine-to-machine (M2M), Internet of things (IoT), or other applications. Traffic such as supervisory control and data acquisition (SCADA) applications, Advanced Metering Infrastructure (AMI) applications, or other such applications may require substantially low throughput on an ongoing basis. Some applications on the remote stations, however, may have bursts of communications activity requiring higher throughput. A system designed for maximum throughput would result in wasted resources, and a system designed for less than maximum throughout would result in lack of available bandwidth for applications requiring burst communications.

According to embodiments of the invention, a base station controller (BSC) 108 may be connected to the plurality of base stations (connection not shown), and may receive bandwidth usage and/or bandwidth requests from a plurality of base stations. As described further herein, according to embodiments of the invention, the BSC 108 may dynamically allocate available sub-channels to each sector to fulfil the traffic requirements at any particular time. A BSC 108 according to embodiments of the invention may store an interference matrix that describes the sectors that may interfere with each other if using the same air sub-channels at the same time. Thus, for example, two adjacent sectors may interfere with each other if using the same sub-channels at the same time, while sectors that are geographically isolated may not interfere if using the same air interface resources at the same time. The interference matrix may be based on the architecture of the particular system, e.g., the geographic location of sectors and their size, the number and type of remote stations located therein, the RF separation between sectors in the uplink and downlink directions, etc. The interference matrix may be predefined, or may be periodically updated based on interference information obtained during operation of the system.

In order to determine the effects of dynamically allocating air interface resources to be shared during "boost" operation, the system may use an interference matrix representing the anticipated interference by each base station on other base stations. In some exemplary embodiments of the invention, the interference matrix may be created by a process described herein. In some embodiments, the interference may be calculated as the difference between communication in the presence of interference, and communication in the absence of interference.

It will be understood that each of the N Base Stations ($BS_n$, where n=1 ... N) has $M_n$ remote stations. In TDD systems, downlink and uplink interference scenarios may be addressed. For downlink interference, downlink communications to a remote station connected to $BS_i$ may be interfered by any other base station, i.e., $BS_j$ for j≠i. For uplink interference, uplink communications from a remote station connected to $BS_i$ may be interfered by any remote station not connected to the same base station, i.e., connected to $BS_j$ for j≠i. Accordingly, separate downlink and uplink interference matrices may be constructed, wherein the downlink interference matrix represents interference by downlink communications of non-associated base stations with each remote station, and the uplink interference matrix represents interference by uplink communications of remote stations communicating with non-associated base stations.

Using the above example, each interference matrix IM has N rows and N columns, representing the N base stations, where each entry $IM_{K,L}$ indicates the level of interference of $BS_L$ to $BS_K$, where the entry for K=L is ignored. The interference level may be represented by the received signal strength indication (RSSI) in dBm, measured in the presence of interference as follows: in the downlink direction, the interference level is recorded as the maximum value of RSSI measured across all remote stations at sector K in the presence of interference; in the uplink direction, the interference level is recorded as the maximum value of RSSI measured at Base Station K for all remote stations in sector K in the presence of interference. The RSSI values in the interference matrix may be populated manually prior to operation, in which case, the values are static; or dynamically, in which case, the interference values may be reported to the BSC by each BS. In the latter case, interference levels may be measured periodically by the base stations as follows. The TDD frames of all base stations are GPS synchronized. Next, a super-frame structure with a configurable period is also synchronized across all base stations. In one TDD frame per period, only one sector is active while all other sectors measure the interference from the active sector.

It will be recognized that when only basic air interface resources are used (i.e., no additional air interface resources are allocated dynamically), there is substantially no interference between base stations. Accordingly, the downlink and uplink RSSI for all remote stations when only basic air interface resources are used, may represent the signal strength in the absence of interference. The BSC may contain tables for the downlink and uplink RSSI for all remote stations in all sectors, which may be used to approximate the signal strength in the absence of interference.

In operation, the level of interference of BS $BS_L$ to $BS_K$ may be computed as the difference between downlink/uplink RSSI in the sector K itself, and the downlink/uplink RSSI from $BS_L$, where the difference is the carrier to interference plus noise ratio (CINR) in dB due to the interference. The CINR determines the forward error correction (FEC) scheme to be used in the presence of the interference. According to embodiments of the invention, in determining whether to allocate sub-carriers to a base station according to a dynamic frequency allocation scheme, the BSC may take into account the expected FEC when two interfering base stations use the same air interface resources at the same time. In determining whether to allocate the air interface resources, the BSC may take into account the expected FEC in order to compute the throughput increase to be gained by allocating the air interface resources to an interfered base station. According to some embodiments, the BSC may compare the throughput increase to a relative or absolute minimum threshold in order to determine whether to dynamically allocate the additional air interface resources.

The interference matrix may be used in statically and dynamically allocating resources, as described below, to allocate resources without creating interference. A BSC 108 according to embodiments of the invention may statically allocate resources (i.e., sub-channels) to accommodate bandwidth requirements of basic or low-traffic applications. This static re-use scheme may be prepared based on the interference matrix so as to optimize air interface resources available to each base station while maintaining a tolerable interference level between geographically proximate sectors. The static allocation may typically account for fewer sub-channels than the total number of available sub-channels. These remaining sub-channels after the static allocation, may be held in reserve, and dynamically allocated by the BSC to certain sectors (and re-allocated to other sectors) on demand to accommodate higher bandwidth applications on a temporary basis.

Figure 2:
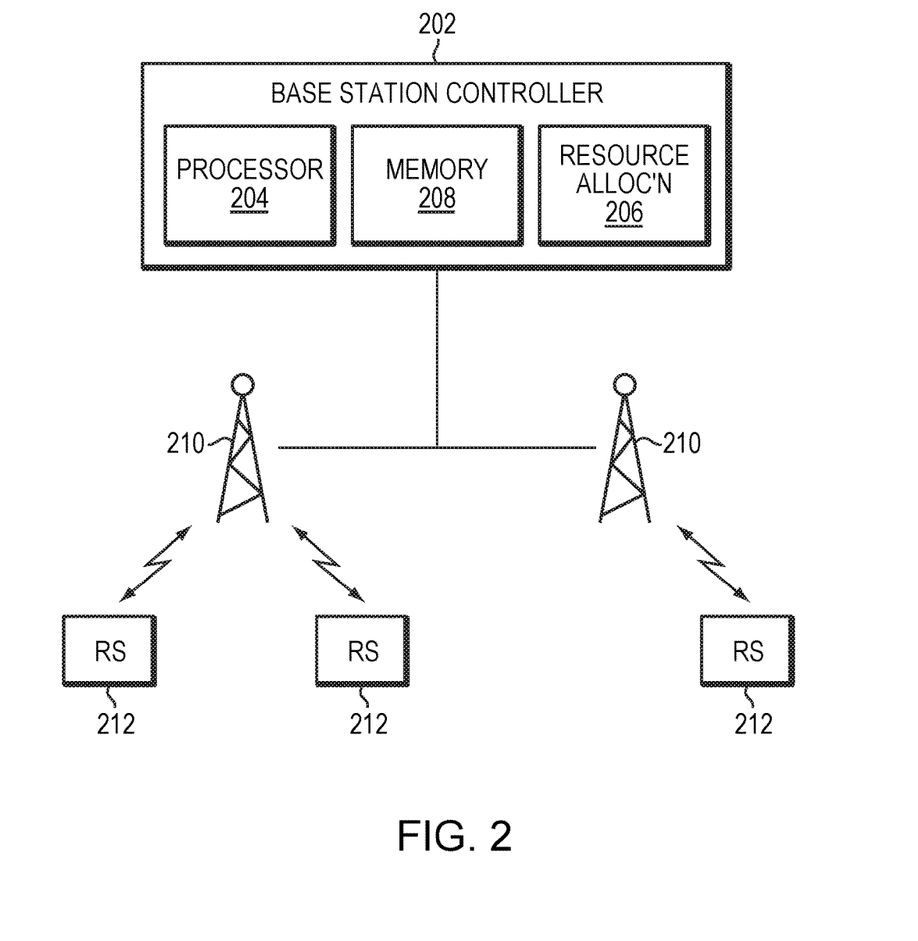
FIG. 2 is a schematic illustration of a broadband wireless communication system, according to an embodiment of the present invention.

Reference is made to FIG. 2, which is a schematic illustration of a broadband wireless communication system 200 according to embodiments of the invention. The system may include a base station controller 202 (BSC), a plurality of base stations (BS) 210, and a plurality of remote stations 212. The BSC 202 may typically be connected to the base stations 210 via a wired connection, although the connection may be wireless. Base stations 210 may serve as access points for remote stations 212 located in a geographic region or a sector associated with the base station. As discussed above, a cell may be served by multiple base stations. Remote stations (RS) 212 may be mobile stations or fixed location stations, and base station (BS) 210 may be in wireless or radio communication with one or more geographically associated remote stations 212.

The BSC 202 may include one or more processors 204 capable of performing the calculations and processing described herein. The processor may be a general-purpose processor operating software or instructions to perform the processes described herein, or a special-purpose for performing the processes. The BSC 202 may further include one or more suitable memories 208 operably connected to processor 204 and capable of storing commands and/or instruction sets for use by the processor and/or data such as the interference matrix.

The BSC 202 may include a sub-channel allocation module 206, which may be a hardware or a software module for performing the sub-channel allocations according to embodiments of the invention. For example, sub-channel allocation module 206 may be a set of instructions residing in memory 208 and executed on processor 204. It will be understood that resource allocation module 206 may be operably connected to memory 208 or any other memory for storing an interference matrix, resource allocation map, or any other required data. As described further herein, according to embodiments of the invention, the resource allocation module may manage the static and dynamic allocation of sub-channels to sectors based on various parameters, including, for example, a BS interference matrix as well as sub-channel availability.

It will be understood that the BSC 202 may include further elements not shown, in order to enable sending, receiving and processing communications to and from the BSs.

According to embodiments of the invention, base stations may request the BSC for allocation of additional channels in the downlink and/or in the uplink direction. The BSC may allocate additional sub-channel resources to the base stations in order to satisfy all or portion of their request. Once the additional sub-channels are allocated by the BSC to the BSs, the base stations employ the additional sub-channels in allocating bandwidth to the remote stations in the uplink and in the downlink directions. For example, a base station may allocate slots subject to the air interface resources available to its sector based on assignment by the BSC. As discussed above, embodiments of the invention may employ Orthogonal Frequency Division Multiple Access (OFDMA), in which air-interface resource may have two dimensions, e.g. frequency and time. In OFDMA systems, the radio resource allocated to users is the sub-channel over time. Thus, the BS allocates slots only within the sub-channels made available by the BSC. The BS allocates slots only within downlink or uplink sub-channels made available to its respective sector.

Figure 3:
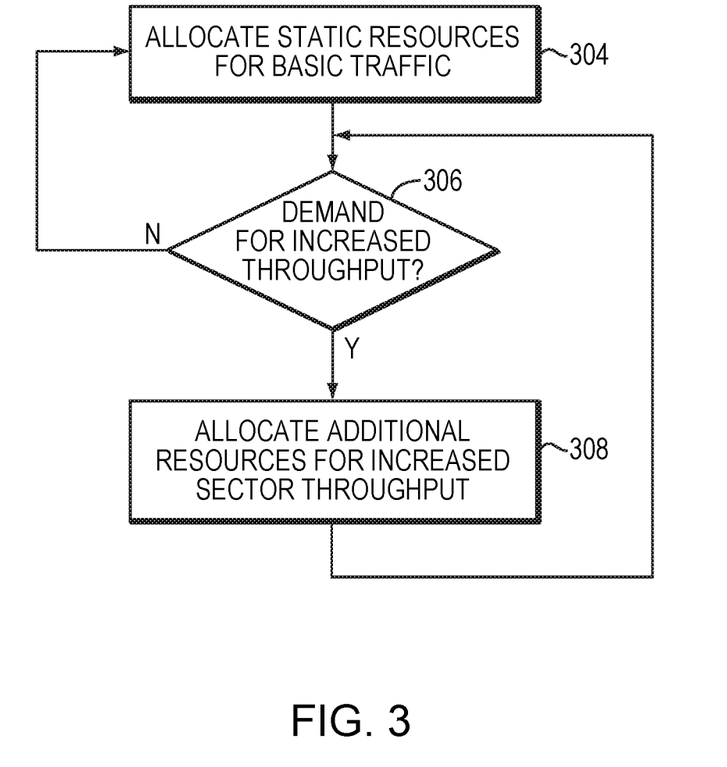
FIG. 3 is a schematic illustration of a flow diagram of steps performed by a method according to an embodiment of the present invention.

Reference is now made to FIG. 3, which is a schematic flow diagram of a method for dynamic sub-channels allocation 300 according to embodiments of the invention. According to an embodiment of the invention, the base station controller may allocate static air interface resources to each sector as needed to satisfy the volume of the continuous basic traffic in each sector, and then dynamically allocate additional air interface resources temporarily to sectors as needed to boost the sector throughput based on the availability of the idle sub-channels of the sector.

At step 304, the BSC may allocate basic, or static, air interface resources for each sector based on basic traffic requirements and an interference matrix, so as to avoid interference. The static allocation may be based on a minimum expected throughout for each sector, for example, based on a pre-set parameter, or historical measurements of prior usage, or requests for resources from the base stations, or other parameters. The BSC may communicate the static allocation to the base stations, which may utilize the statically assigned resources to communicate with their respective remote stations.

The BS identifies increased throughput demand for uplink and/or downlink communication and sends a request for additional uplink/downlink air interface resources to the BSC as per step 306. If there is no demand for increased throughout, the BSC may maintain the static allocation for basic traffic. Similarly, after a demand for increased throughout has been satisfied, for example, based on a message from the BS that throughput is no longer required, and there is no longer demand for increased throughput, the BSC may revert to the static allocation.

At step 308, if the BSC determines a demand for increased throughput, it may dynamically allocate additional resources to boost the sector throughput. According to embodiments of the present invention, in determining the dynamic resource allocation, the BSC may take into account the interference matrix. Thus, for example, where a first sector requests additional throughput, the BSC may determine based on the interference matrix, which resources are being used by sectors that interfere with the first sector. The BSC may dynamically assign to the requesting base station (a) idle sub-channels that are not being used by interfering sectors, and (b) non-idle sub-channels used by non-interfering sectors. In the event the BSC received requests for throughput from more than one base station, the BSC may divide available resources among requesting base stations.

As a non-limiting example, embodiments of the invention may employ a FullMAX protocol. It will be understood that the FullMAX protocol is provided as an example only, and that systems may use other frequency blocks, bandwidths, and uplink/downlink channels in connection with the present invention. A FullMAX system may operate in the 700 MHz upper A block, consisting of two 1 MHz channels: 787-788 MHz (centered at 787.5 MHz), and 757-758 MHz (centered at 757.5 MHz). The system may be a TDD system and as such, each of the two 1 MHz wide channels may be used in both downlink and uplink directions. The number of sub-channels in the downlink and uplink directions may be determined by the FFT scheme and the sub-carrier allocation scheme used in each direction (which may be different from each other). The partition of air resources in each direction may be determined by the time ratio of downlink transmission to uplink transmission.

According to an embodiment of the invention, the Base Station Controller may statically allocate for each sector one downlink sub-channel and one uplink sub-channel to satisfy the basic traffic requirements, and reserve a pool or bank of the remaining uplink and downlink sub-channels as idle. It will be understood that the BSC may perform the static allocation of specific sub-channels in each sector based on the interference matrix in order to avoid interference between sectors. The BSC may then dynamically allocate additional sub-channels from the bank of idle sub-channels for throughput boosting as needed.

For example, according to an exemplary embodiment of the invention using FullMAX, the system may employ 128 FFT OFDMA with a 2×3 band AMC sub-carrier allocation scheme in both the downlink and uplink directions, resulting in partitioning of the RF channel into six orthogonal sub-channels in both the downlink and uplink directions. Thus, for example, the Base Station Controller may allocate two sub-channels (e.g., sub-channels 0 and 1) for basic traffic requirements, and reserve four idle sub-channels (e.g., sub-channels 2, 3, 4 and 5) to be dynamically assigned for supporting throughput boosting, implying a re-use factor of K=4, thus maintaining 2×4 sub-channels for the dynamic allocation pool. It will be understood that the BSC may perform the dynamic allocation of these sub-channels based on the interference matrix in a way that avoids interference between sectors. If necessary, the BSC may move basic traffic communication on a non-requesting sector to a non-interfering sub-channel in order to permit that sub-channel to be used by a requesting sector.

According to another embodiment of the invention using FulMAX, one 1 MHz channel may be used to satisfy the basic traffic requirements, and the sub-channels of the second 1 MHz channel may be used to support throughput boosting. It will be recognized that according to embodiments of the invention, throughput boosting may require an entire sector to change from the first to the second channel frequency. The bandwidth available to each sector may vary between a single sub-channel to a full channel, i.e., 6 sub-channels.

Figure 4:
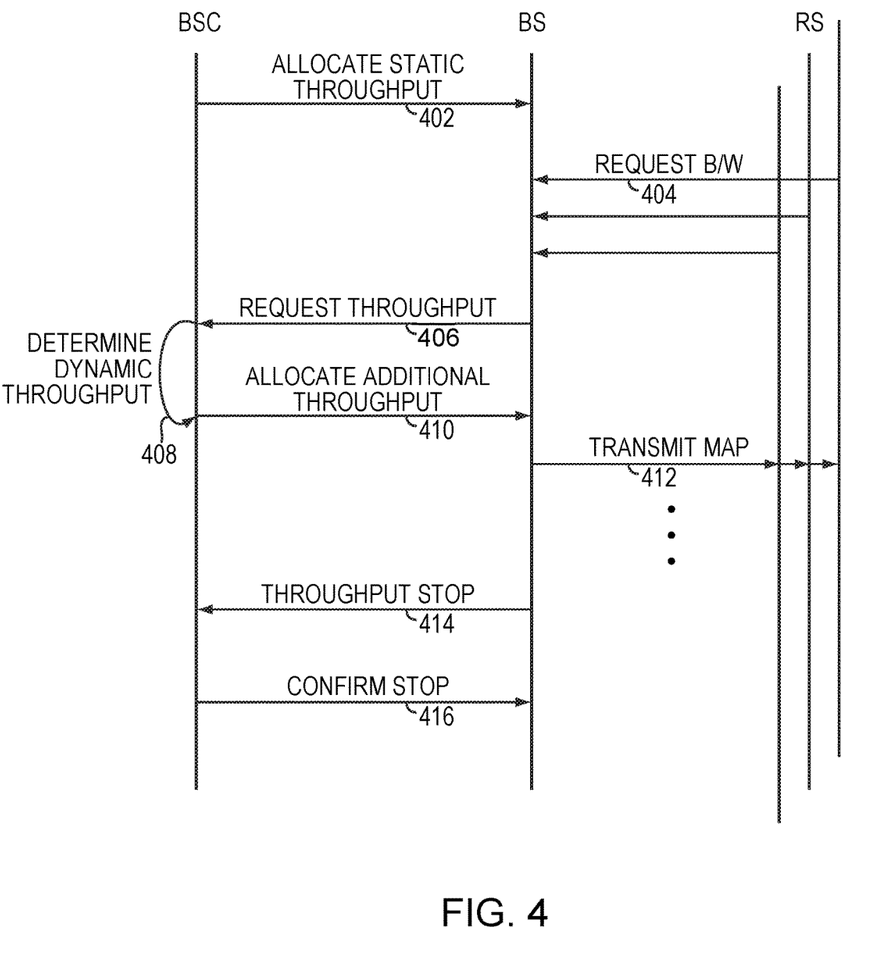
FIG. 4 is a schematic illustration of a message sequence chart (MSC) according to an embodiment of the present invention.

Reference is made to FIG. 4, which presents a message sequence chart (MSC) 400 among the BSC, BS, and a plurality of RSs associated with the BS according to an embodiment of the present invention. It will be understood that other BSs in the system may likewise communicate according to similar MSC protocols.

At step 402, the BSC allocates static throughput for the BS, for example, based on a predetermined parameter, historical usage, or other factors.

At step 404, the remote stations provide the BS with requests for bandwidth resources based on requirements or request of applications operating on the remote stations.

At step 406, if the BS identifies a demand for increased throughput demand for uplink/downlink communication, it may send to the BSC a request for throughput for additional uplink/downlink air interfaces resources.

At step 408, the BSC may determine whether (and if so, how much) to dynamically allocate additional air interface resources to the BS. In making this determination, the BSC may consider factors such as the available or idle air interface resources in the uplink and/or downlink directions and the assigned or non-idle air interface resources being used by non-interfering sectors. In the event of multiple simultaneous requests for throughput that together exceed the available throughput, BSC may divide available resources between multiple BSs, for example, evenly or prorated based on the amount of throughput requested. It will be understood that the request for throughput may be a message without a bandwidth parameter, in which case, the BSC may simply divide available resources among requesting BSs.

At step 410, the BSC may respond to the BS with a message allocating additional throughput to the BS.

At step 412, the BS may transmit an allocation map, e.g., a downlink and/or uplink map to the associated mobile stations based on the additional bandwidth allocation. According to embodiments of the invention using FullMAX technology, the BS may broadcast or transmit to all remote stations a downlink MAP (DL-MAP) message including the DL allocations and an Uplink MAP (UL-MAP) message including the UL MAP IE defining uplink (UL) allocations for all UL bursts transmitted by remote stations. Accordingly, in an embodiment of the invention, the BS may announce to all remote stations in the sector to move from the first channel to the second channel by transmitting a DL-MAP message. The switching to the other channel may take place during the "transmit to receive" gap immediately following the hopping indication. In another embodiment of the present invention, the BS may announce to all remote stations by transmitting a DL-MAP message followed by a UL-MAP message, indicating which sub-channels are used in DLSF and ULSF at each frame.

At step 414, after the BS determines that the need for throughput has ceased, it may send a message to the BSC to stop the throughput request.

At step 416, the BSC may confirm to the BS that the stop request has been received, and the BS may revert to the static resource allocation. The BSC may then reallocate the freed sub-channel resources to satisfy a throughput request of another sector.

Unless explicitly stated, the method embodiments described herein are not constrained to a particular order in time or chronological sequence. Additionally, some of the described method elements may be omitted, or they may be repeated, during a sequence of operations of a method.

Various embodiments have been presented. Each of these embodiments may of course include features from other embodiments presented, and embodiments not specifically described may include various features described herein.

The invention claimed is:

1. A method of dynamic allocation of sub-channels in an OFDMA wireless network having a plurality of cells, for use in a base station controller, the method comprising:

allocating to a plurality of base stations a first plurality of sub-channels according to a static allocation, wherein the number of sub-channels allocated to each base station is less than the number of available sub-channels, thereby resulting in available remaining sub-channels for each base station that are not assigned in the static allocation;

receiving a request from at least one of said base stations for increased throughput in downlink and/or uplink;

allocating at least one additional sub-channel to said requesting base station from among said remaining sub-channels not in use for static allocation according to a dynamic allocation, wherein the allocating comprises:
 i) determining an expected forward error correction (FEC) based on an interference matrix,
 ii) calculating based on the expected FEC an amount of throughout increase to be obtained based on allocating the additional sub-channel, and
 iii) determining whether to allocate said additional sub-channel based on the calculated amount of throughput increase; and transmitting a message to said requesting base station based on said dynamic allocation.

2. The method of claim 1, further comprising after allocating said first plurality of sub-channels, determining available remaining sub-channels for dynamic allocation, wherein dynamically allocating said at least one additional sub-channel is based on idle sub-channels.

3. The method of claim 1, wherein allocating said at least one additional sub-channel according to a dynamic allocation comprises allocating one or more sub-channels from among said remaining sub-channels based on an interference matrix.

4. The method of claim 1, wherein said static allocation allocates air interface resources on a first channel and said dynamic allocation allocates air interface resources on a second channel.

5. The method of claim 1, wherein said OFDMA wireless network is configured for a plurality of uplink sub-channels and a plurality of downlink sub-channels, wherein said static allocation includes one downlink sub-channel and one uplink sub-channel for each said base station, and wherein dynamically allocating said at least one additional sub-channel comprises allocating additional air interface resources from the sub-channels not assigned in the static allocation.

6. The method of claim 1, further comprising, at a base station:

receiving said message based on said dynamic allocation; and transmitting to remote stations in communication with said base station to communicate according to said dynamic allocation.

7. A base station controller configured to manage dynamic allocation of sub-channels for a plurality of base stations in an OFDMA wireless network, the base station controller comprising:

a processor;

a non-transitory computer-readable medium in data communication with the processor and comprising instructions which when executed cause the processor to:

allocate to said plurality of base stations a first plurality of sub-channels according to a static allocation, wherein the number of sub-channels allocated to each base station is less than the number of available sub-channels, thereby resulting in available remaining sub-channels for each base station that are not assigned in the static allocation;

receive a request from at least one of said base stations for increased downlink and/or uplink throughput;

allocate at least one additional sub-channel to the requesting base station from among said available remaining sub-channels according to a dynamic allocation; and, transmit a message notifying of allocation of the allocation of said at least one additional sub-channel to the requesting base station; and wherein the allocating further comprises: i) determining an expected forward error correction (FEC) based on an interference matrix, ii) calculating based on the expected FEC an amount of throughout increase to be obtained based on allocating the additional sub-channel, and iii) determining whether to allocate said additional sub-channel based on the calculated amount of throughput increase.

8. The base station controller of claim 7, wherein the instructions when executed further cause the processor to:

after allocating said first plurality of sub-channels, determine available remaining sub-channels for dynamic allocation, wherein said processor is to allocate said at least one additional sub-channel based on idle sub-channels.

9. The base station controller of claim 7, wherein said remaining available sub-channels for dynamic allocation include air interface resources used by base stations that substantially do not interfere with other geographically proximate base stations.

10. The base station controller of claim 7, wherein said processor is to allocate said at least one additional sub-channel according to a dynamic allocation by allocating one or more sub-channels from among said remaining sub-channels based on an interference matrix.

11. An OFDMA wireless communication system including:

a plurality of base stations;

a base station controller in communication with said plurality of base stations, said base station controller for managing dynamic allocation of sub-channels for said plurality of base stations, and configured to:

allocate to said plurality of base stations a first plurality of sub-channels according to a static allocation, wherein the number of sub-channels allocated to each base station is less than the number of available sub-channels, thereby resulting in available remaining sub-channels for each base station that are not assigned in the static allocation, receive a request from at least one of the said base stations for increased throughput in downlink and/or uplink, allocate at least one additional sub-channel to said requesting base station from among said remaining sub-channels not in use for static allocation according to a dynamic allocation, wherein the allocating further comprises:

i) determining an expected forward error correction (FEC) based on an interference matrix, ii) calculating based on the expected FEC an amount of throughout increase to be obtained based on allocating the additional sub-channel, and iii) determining whether to allocate said additional sub-channel based on the calculated amount of throughput increase; and transmit a message to said requesting base station on said dynamic allocation, wherein said base stations are configured, upon receiving said message from the base station controller, to transmit to geographically proximate remote stations an uplink and/or downlink map based on said message received from the base station controller.

* * * * *